United States Patent [19]
Duncan et al.

[11] Patent Number: 5,905,591
[45] Date of Patent: May 18, 1999

[54] MULTI-APERTURE IMAGING SYSTEM

[75] Inventors: Alan L. Duncan, Sunnyvale; Richard Lee Kendrick, Foster City; Robert D. Sigler, Cupertino, all of Calif.

[73] Assignee: Lockheed Martin Corporation, Sunnyvale, Calif.

[21] Appl. No.: 08/801,631

[22] Filed: Feb. 18, 1997

[51] Int. Cl.$^6$ .............................. G02B 23/00; A47B 91/00
[52] U.S. Cl. ........................ 359/399; 359/419; 248/346.3
[58] Field of Search ................................. 359/399, 419, 359/429; 248/346.3, 476

[56] References Cited

U.S. PATENT DOCUMENTS

| | | | |
|---|---|---|---|
| 3,980,879 | 9/1976 | O'Meara | 250/201 |
| 4,141,652 | 2/1979 | Feinleib | 356/121 |
| 4,309,602 | 1/1982 | Gonsalves et al. | 250/201 |
| 4,600,308 | 7/1986 | Waite | 356/363 |
| 4,696,573 | 9/1987 | Hutchin | 356/353 |
| 4,824,243 | 4/1989 | Wheeler et al. | 356/121 |
| 4,981,354 | 1/1991 | DeHainaut et al. | 356/141 |
| 5,108,168 | 4/1992 | Norbert et al. | 359/419 |
| 5,120,128 | 6/1992 | Ulich et al. | 356/121 |
| 5,128,530 | 7/1992 | Ellerbroek et al. | 250/201.3 |
| 5,157,459 | 10/1992 | Oono et al. | 356/359 |
| 5,229,592 | 7/1993 | Horwitz et al. | 250/201.9 |
| 5,229,889 | 7/1993 | Kittell | 359/849 |
| 5,243,351 | 9/1993 | Rafanelli et al. | 342/351 |
| 5,287,165 | 2/1994 | Ulich et al. | 356/121 |
| 5,300,766 | 4/1994 | Granger et al. | 250/201.9 |
| 5,350,911 | 9/1994 | Rafanelli et al. | 250/201.9 |
| 5,384,455 | 1/1995 | Paxman | 250/201.9 |

OTHER PUBLICATIONS

Harvey, James & Rockwell, Richard, "Performance characteristics of phased array and thinned aperture optical telescopes", Optical Engineering Sep. 1988, vol. 27 No. 9 pp. 762–768.

*Primary Examiner*—Cassandra C. Spyrou
*Assistant Examiner*—Mark A. Robinson
*Attorney, Agent, or Firm*—Feix & Feix

[57] ABSTRACT

A multi-aperture imaging system for continuous dwell imaging of complex extended scenes which are not required to contain localized point sources. The multi-aperture imaging system includes a plurality of subaperture telescopes, each of which collect image data of an instantaneous field of view of an extended object scene within a field of regard of the imaging system. The image data collected by each subaperture telescope is transferred by respective optical delay paths to a beam combiner which combines all the image data in coherent fashion to form a single high resolution image of said object scene at a focal plane of the beam combiner. The subaperture telescopes are optically phased using phase diversity techniques which include using a phase diversity sensor located at the focal plane of the beam combiner to detect wavefront errors in the collected images. A phase controller is used to make phase and tilt adjustments to moveable mirror in the optical delay paths of the respective subaperture telescopes to ensure that the path length travelled by the collected image data from each subaperture telescope is maintained equal. The subaperture telescopes are supported on a deployable Y-shaped framework which folds up for compact stowage within a satellite launch canister. The subaperture telescopes are spaced in a redundant array sufficient to provide a desired uniform coverage of the spatial frequencies of a modulation transfer function (MTF) of the imaging system.

17 Claims, 5 Drawing Sheets

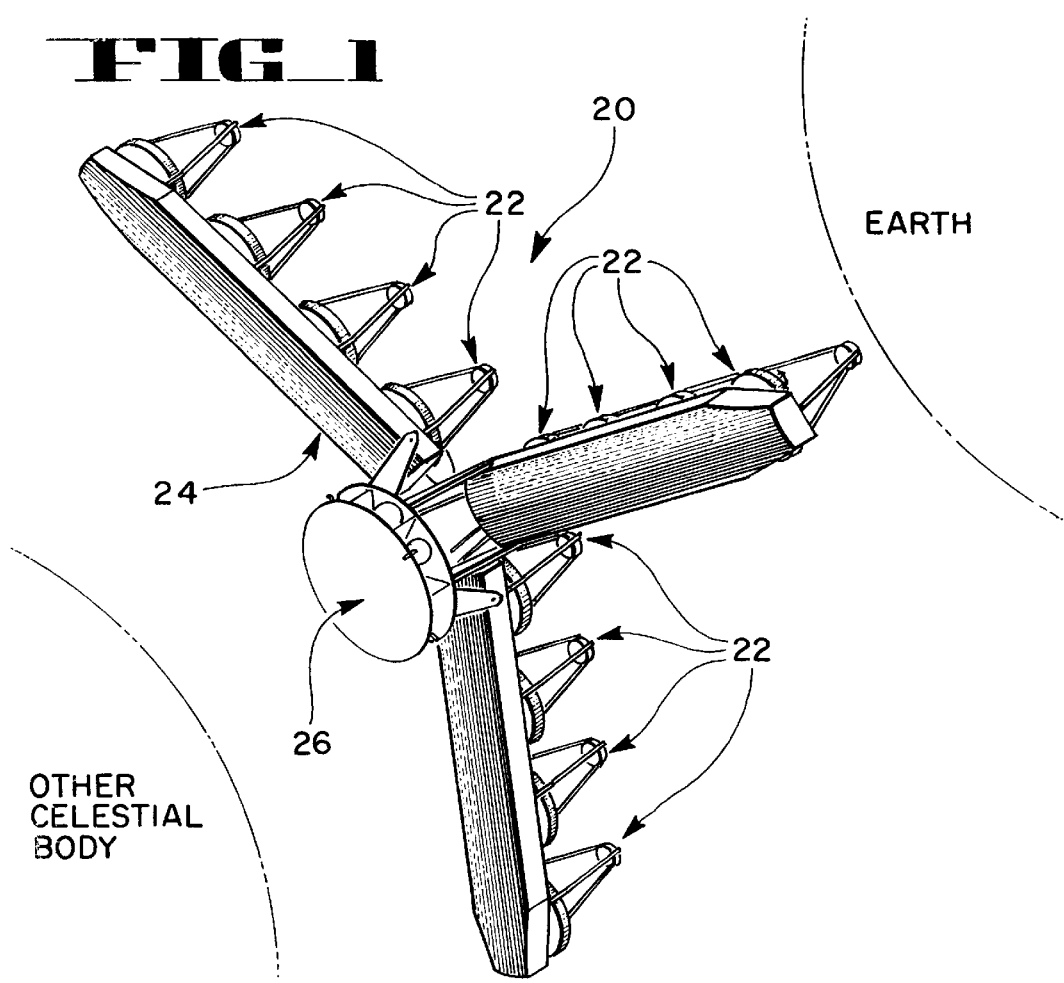
FIG_1
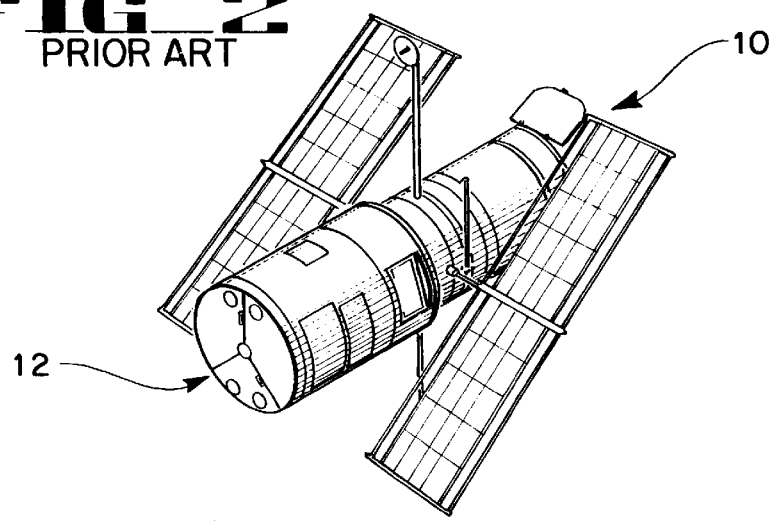
FIG_2 PRIOR ART

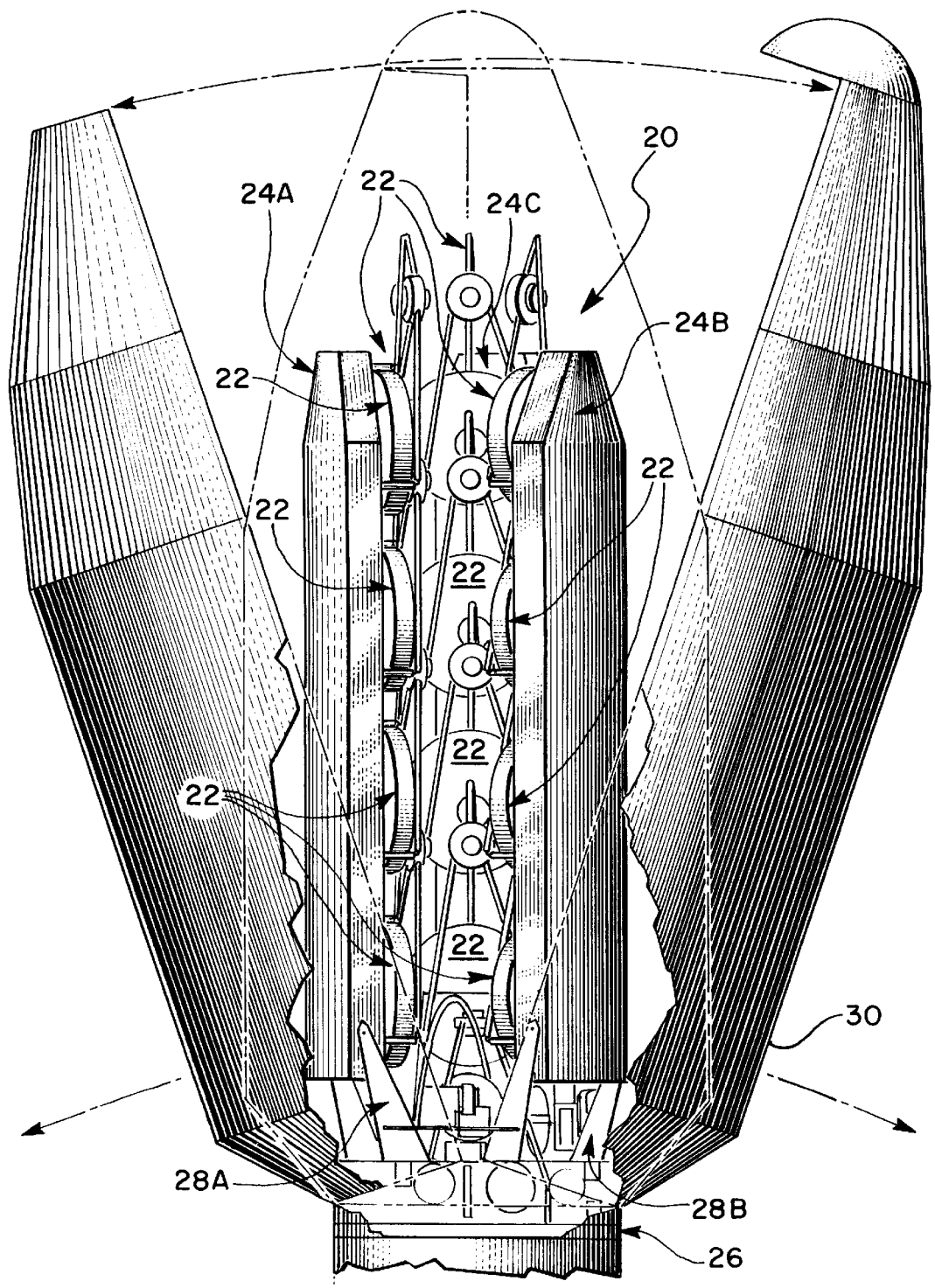
FIG_3

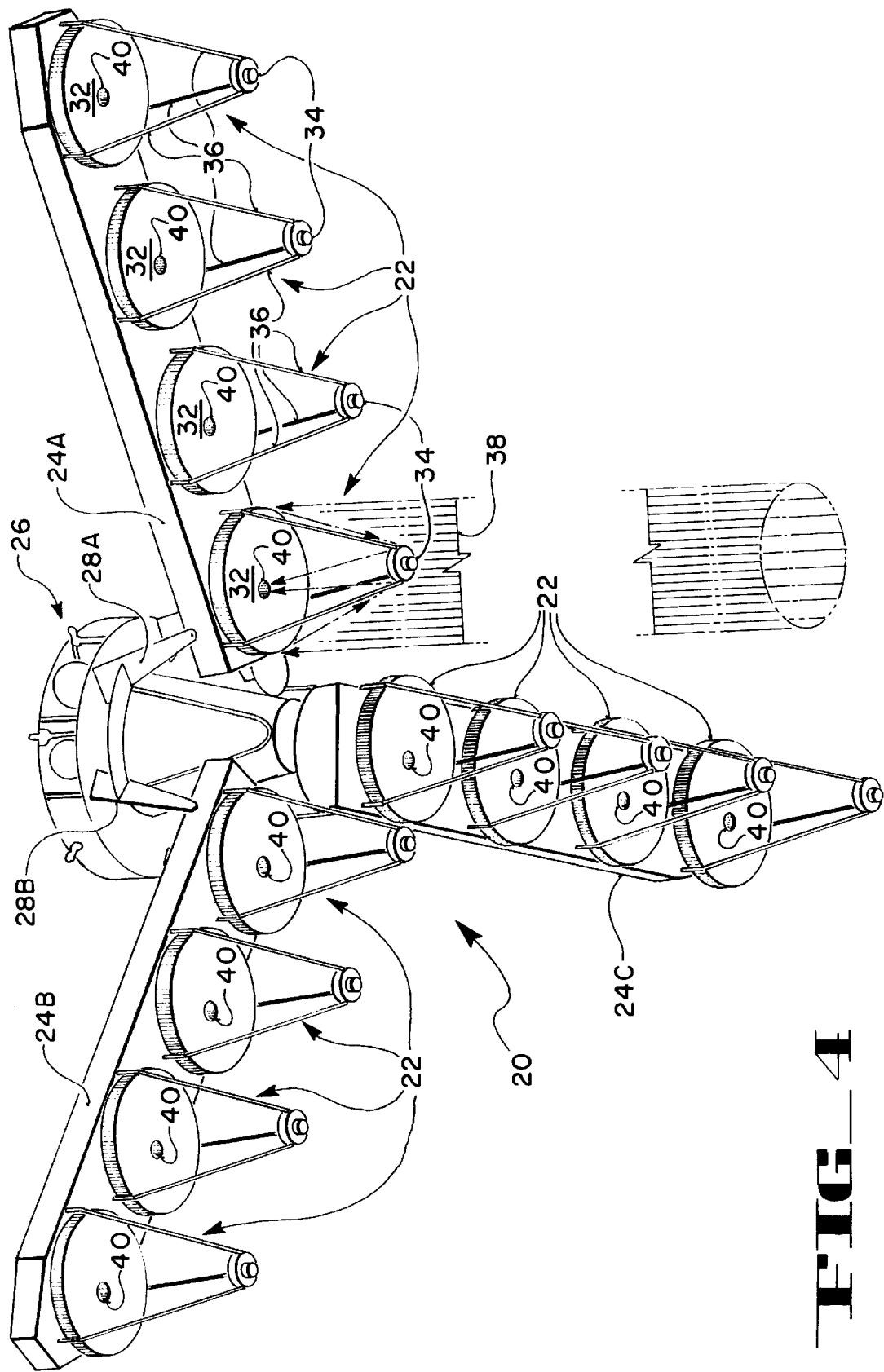
FIG_4

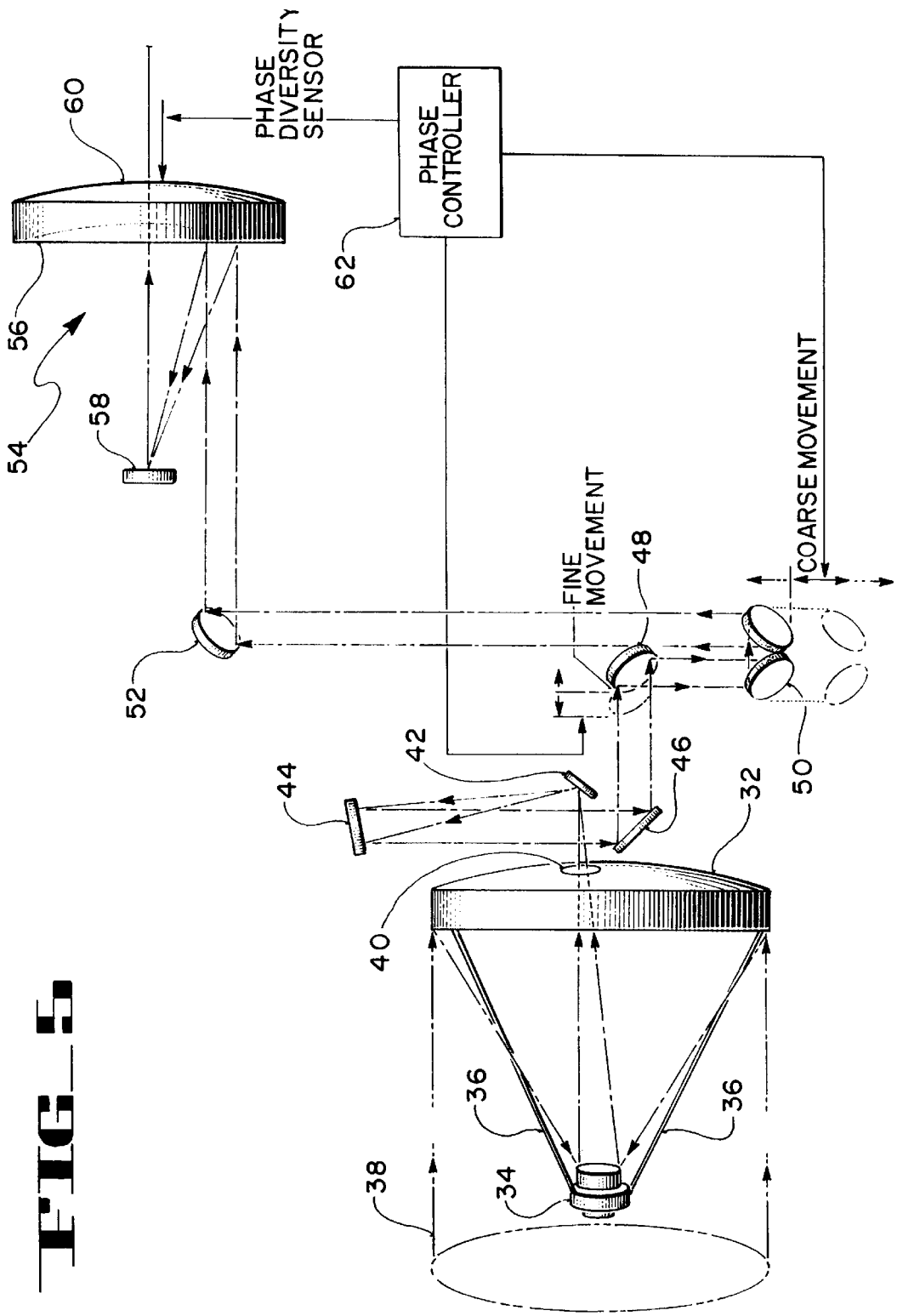
FIG_5

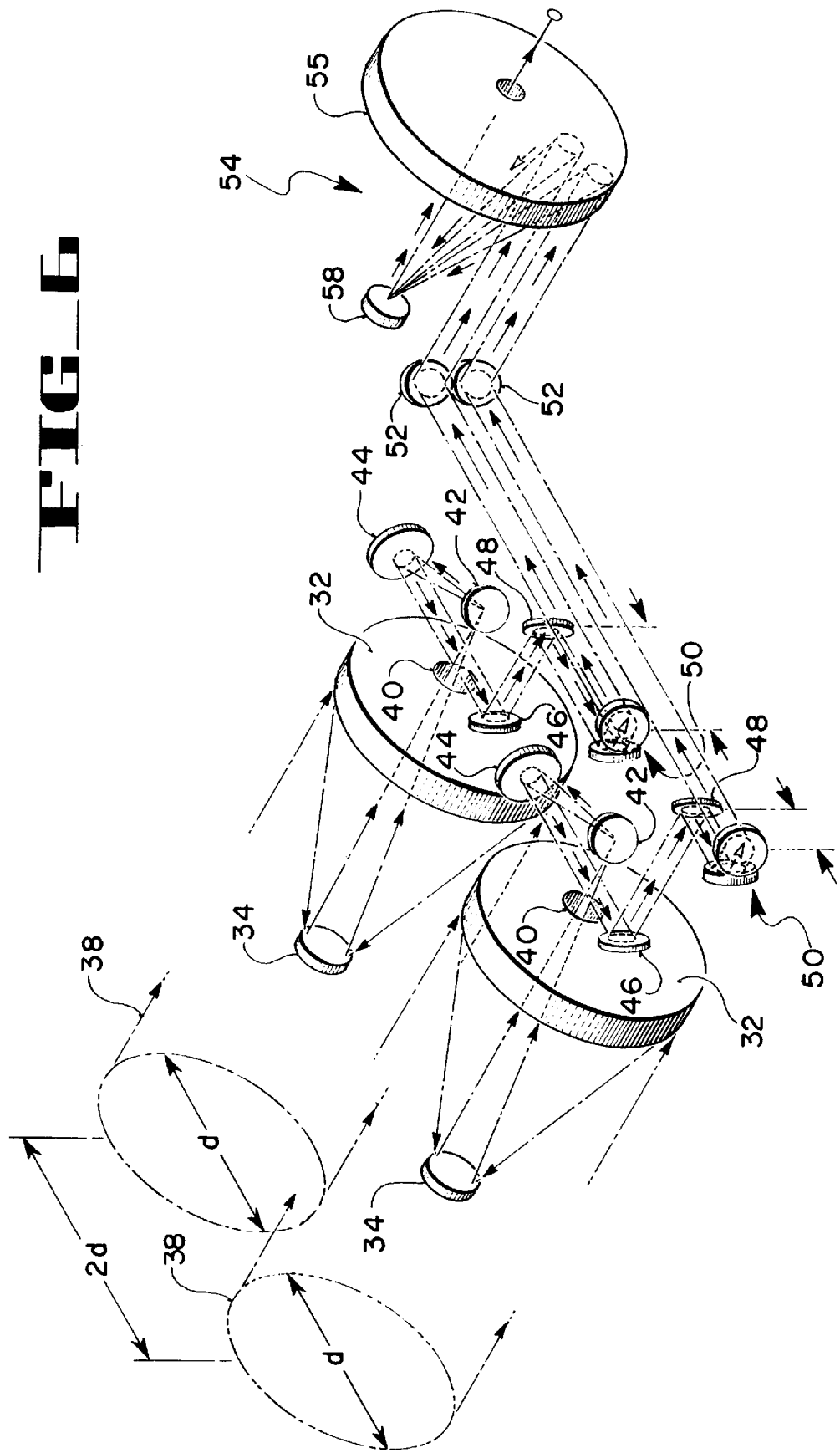
FIG_6

MULTI-APERTURE IMAGING SYSTEM

CROSS REFERENCES TO RELATED U.S. APPLICATIONS

The co-pending application Ser. No. 08/499,608 now U.S. Pat. No. 5,598,261 filed Jul. 7, 1995 and entitled "WAVEFRONT SENSOR FOR A SCANNING IMAGER", Alan L. Duncan, Daniel Scott Acton and Richard Lee Kendrick inventors, is incorporated by reference in this application.

The co-pending application Ser. No. 08/499,325 now U.S. Pat. No. 5,610,707 filed Jul. 7, 1995 and entitled "WAVEFRONT SENSOR FOR A STARING IMAGER", Alan L. Duncan, Daniel Scott Acton and Richard Lee Kendrick inventors, is also incorporated by reference in this application.

TECHNICAL FIELD

The present invention relates generally to large aperture optical imaging systems adapted to provide high resolution images from space-based platforms. More particularly, the present invention relates to a deployable multiple aperture optical imaging system that synthesizes circular (full) images from image data collected from a plurality of optically phased subaperture telescopes. The multiple aperture optical system of the present invention is designed to be launched and deployed from existing space shuttle launch systems.

BACKGROUND OF THE INVENTION

To provide high resolution imagery of distant extended scenes, relatively large aperture optical systems are required. The aperture diameters are typically on the order of several meters. Increasing the diameter of a conventional telescope increases its resolution of fine detail in proportion to the telescope diameter. The light-gathering power of a telescope also increases as the square of the diameter. It is also true, however, that the cost and difficulty to manufacture an optical telescope increases significantly as the diameter of the telescope is increased. Recent advancements in space astronomy have resulted in the launch and deployment of optical telescopes in space which are able to provide imagery of distant celestial objects having significantly greater spatial resolution and point source sensitivity over imagery obtained from comparable Earth-based telescopes by virtue of simply placing the telescope above the Earth's atmosphere.

An example of the current state of the art in space-based telescopes is the Hubble Space Telescope designated generally by the reference numeral 10 in FIG. 1. The Hubble Space Telescope 10 is designed to be launched and deployed from the cargo bay of the Space Shuttle. The collection surface 12 of the Hubble Space Telescope 10 consists of a single (fill) aperture lens on the order of about 2.5 meters. Since the Hubble Space Telescope completely fills the Space Shuttle cargo bay, the aperture diameter for the telescope is already at a maximum. Accordingly, the resolution limit of the single aperture space imaging system like the Hubble Space Telescope is already at its practical limit.

In order to change the line of site of a single full aperture lens optical system like the Hubble Space Telescope, it is necessary to move the entire telescope support structure and lens to aim the lens to the desired field of view. As is readily appreciated by those of skill in the art, the rigid telescope support structure must be sufficiently stiff such that reaction forces exerted on the support structure during positioning changes do not adversely effect the sensitive image collecting optics of the telescope. The measure of stiffness required translates into added weight and cost. For space applications, it is desirable to reduce weight when ever possible.

It is also known to fabricate certain large optical systems, such as mirrors, as a number of segmented and foldable components in order to reduce fabrication costs and weight, as well as provide a means to package the large mirrors into the cargo bays of existing space launch vehicles. Thus, it is conceivable to build a multi-meter diameter segmented full aperture optical system that is capable of gathering more light than the current state of the art single aperture space telescopes for improved high resolution imagery. However, in order to place a multi-meter diameter segmented full aperture system in space, stiff foldable support structures would be needed in order to compactly stow the multi-segmented fall aperture optical system within the cargo space of a launch vehicle. If thin deformable mirrors are used to save weight, then complex and potentially high bandwidth adaptive optics will be necessary. Further, if the optical system is to be implemented as a phased array, then complex piston and pupil matching control is required. In view of the above factors, a multi-meter diameter segmented full aperture optical system would be relatively heavy and have high technical risk.

It is known to increase image resolution of an optical system merely by increasing the is extent of the aperture without requiring a continuous collecting surface. In this way a number of subapertures could be used in place of a single large aperture to achieve increased resolution.

Earth-based multiple aperture optical systems of the type which include a number of smaller subaperture telescopes capable of providing image resolution of a single large aperture telescope are known from the prior art. Such known earth-based systems (sometimes also referred to as "sparse aperture" or "thinned aperture" optical systems) are limited in their performance by the presence of optical wavefront errors. Adaptive optics are capable of removing these wavefront errors but only if an accurate measurement of the wavefront is available. Therefore, a wavefront sensor must be incorporated into the imaging system. The standard technique for measuring the wavefront errors in earth-based sparse-aperture systems is to measure the interference between different telescope images in order to determine whether or not the subaperture telescopes are in phase. Such interference-type sensors can only make measurements from point sources, such as a star or a laser beacon. Thus, the known multiple aperture optical systems are not able to maintain phasing of the subaperture telescopes for applications which involve complex, extended scenes that do not contain localized point-like objects.

Phase diversity is a known technique that is used to estimate the wavefront errors directly from the image data, irrespective of whether or not the image scene contains point sources. In accordance with the known phase diversity technique, two or more phase-diverse images are collected. One of the images is the conventional focal plane image of the object scene that has been degraded by the unknown wavefront errors. Additional images of the same object scene are formed by introducing a known aberration, for example a defocus error, in the image. This can be accomplished with relatively simple optical hardware. The two images can then be compared to determine the wavefront errors in the imaging system.

To the inventors' knowledge, the sparse or multiple aperture concept for synthesizing a multi-meter full aperture telescope using phase diversity techniques has yet to be successfully implemented. Accordingly, a multi-aperture optical imaging system adapted for compact stowage within and deployment from existing satellite launch vehicles and which can provide image resolution equal to or better than current state of the art full aperture optical systems and which could maintain phasing of the multiple apertures would constitute a significant advance in the art.

SUMMARY OF THE INVENTION

It is therefore a principle objective of the present invention to provide a multi-meter diameter multi-aperture imaging system which is stowable within and deployable from existing satellite launch canisters.

It is another object of the present invention to provide a deployable multi-aperture telescope of the type described which includes a plurality of subaperture telescopes that are phased by a simple phase diversity sensor which enables the subaperture telescopes to provide improved image resolution of complex extended scenes that are not required to have localized point sources.

A presently preferred embodiment of the present invention includes a simple, light weight foldable framework of Y-shape configuration having three elongated extendible arm members which are pivotally attached to a central bus. The arm members deploy much like an umbrella from a first, upright folded position for stowage within a confined volume launch vehicle, to a second, outwardly open position for use in space. A plurality of subaperture telescopes are positioned at regular intervals along each arm member. Image data of an extended object scene is collected by the subaperture telescopes and is transferred via respective optical delay paths to a beam combiner contained within the bus. The image data from the subaperture telescopes are coherently added together to form a single high resolution image at the focal place of the beam combiner. The multiple subaperture telescopes are maintained in phase using phase diversity techniques that include placing a phase diversity sensor at the focal plane which allows wavefront errors to be extracted directly from the collected image data. The optical delay paths include active optics responsive to the phase diversity sensor to correct for phase and line of sight errors in the imaging system.

Among the advantages of the present invention is that extreme structural stability tolerances are not required. The multi-aperture imaging system of the present invention is insensitive to subaperture telescope rigid body degrees of freedom. The invention only requires active control of small mirrors in magnified space. Further, the invention has simple deployment requirements.

Another advantage of the invention is that it utilizes a simple and low cost phasing concept, phase diversity. With phase diversity the present invention is able to quickly extract phasing error from images. This, in turn, reduces image processing and image reconstruction requirements.

Another advantage of the invention is that the large field of regard provided by the multi-aperture system does not require satellite slewing to change the instantaneous field of view of the system. Each subaperture telescope has a full field of view which is equal to the field of regard of the system. The line of sight of each subaperture telescope can be changed quickly in a step/stare fashion to look at different portions of the field of regard by using movable small beam combining mirrors in the optical delay paths.

Another advantage of the invention is that the subaperture telescopes are of simple and low cost design. The small field of view of the subaperture telescopes for single images simplifies the overall design of the imaging system. Further, unlike segmented primary (full aperture) imaging systems, the present invention does not require large off-axis optics.

Another advantage of the present invention is that the subaperture telescopes are easy to sun shield. This results in increased access time.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric perspective view of a multi-aperture imaging system constructed in accordance with one embodiment of the present invention.

FIG. 2 is a perspective view of the prior art multi-meter diameter full aperture Hubble Space Telescope.

FIG. 3 is a perspective view of the multi-aperture imaging system as shown in a stowed position within a launch canister.

FIG. 4 is a perspective view of the multi-aperture imaging system as shown in the deployed position.

FIG. 5 is a schematic view of an optical delay path and active optics associated with one of the subaperture telescopes of the multi-aperture imaging system.

FIG. 6 is an isometric perspective view which illustrates how image data received at the respective collection surfaces of two adjacent subaperture telescopes is transferred via the respective optical delay paths to form an image at the focal plane of a beam combiner.

DETAILED DESCRIPTION OF THE PREFERRED EMBODIMENTS

A multi-aperture imaging system constructed in accordance with one embodiment of the present invention is indicated generally by the reference numeral 20 in FIG. 1.

The multi-aperture imaging system 20 includes a plurality of subaperture telescopes 22 that disposed spaced apart along the extending arm members 24a, 24b, 24c of framework 24. At the center of the framework 24 is a hub or bus 26 which contains among other things, the focal plane of the imaging system, a phase diversity sensor, image processing means, and a communications link.

The subaperture telescopes 22 can be aimed towards the earth as shown in order to collect images of the earth's surface for earth resources applications. Alternatively, the subaperture telescopes can be aimed at other celestial objects or bodies for astronomy applications.

As best seen in FIG. 3, the multi-aperture imaging system 20 is specially designed to be launched and deployed using existing satellite launch systems. FIG. 3 shows the multi-aperture imaging system 20 in a compactly stowed position within a launch fairing 30. The launch fairing 30 is shown in a partially open position. The individual arms 24a, 24b, 24c of the framework 24 are pivotally connected to the bus 26 by pivot connections 28a, 28b, 28c, respectively.

In accordance with a preferred embodiment of the invention, the arm members 24a, 24b, 24c are spaced 120 degrees apart from each other such that they define of framework 24 of generally Y-shape configuration. The arm members 24a, 24b, 24c are preferably fabricated from lightweight and stiff material. Suitable materials include space proven composites, such as, for example, graphite epoxy materials.

One advantage of the Y-shape framework configuration is that it simple in design and therefore allows for easy and reliable deployment. The Y-shape configuration also permits placement of the subaperture telescopes 22 in a desired symmetrically spaced array to best synthesize a multi-meter diameter full aperture telescope. In the embodiment shown, the Y-shape framework 24 unfolds to a diameter on the order of 25 meters. Each subaperture telescope 22 has a collection surface on the order of 2 meters and has an image reduction ratio of 10:1. In the preferred embodiment as shown, there are a total of twelve subaperture telescopes 22, with four arranged along each arm member 24a, 24b, 24c.

It is understood that the present invention need not be limited to use of a framework of Y-shape configuration. Other collapsible and foldable framework configurations could also be considered so long as the framework is compactly stowable, easy to deploy, and allows for a desired symmetrical spacing of the subaperture telescopes to provide a desired uniform coverage of the modulation transform function.

As is seen in FIG. 3, the subaperture telescopes 20 are collapsible. This collapsible feature assists in the compact folding and stowage capability of the system. Referring to FIG. 4, each subaperture telescope 22 includes a primary mirror 32 and a secondary mirror 34. The secondary mirror 34 is supported at a generally centered position above the primary mirror 32 by plural arms 36. In the embodiment described herein, three arms 36 are shown. The opposing end of each arm 36 is preferably pivotally connected to its respective primary mirror 32 and secondary mirror 34. In a preferred embodiment, at least one of the arms 36 of each subaperture telescope 22 includes a lock-out mechanism (not shown). The lock out mechanism is effective to lock the arms 36 in the deployed position (shown in FIG. 4) in order to securely position the secondary mirror 34 at the desired location in front of the primary mirror 32 of each subaperture telescope 22. A single pull tether (also not shown) may be used to link the secondary mirror 34 of each subaperture telescope 22 to facilitate the simultaneous raising of the folded arms 36 of the subaperture telescopes 22 into the deployed position.

Each of the arm members 24a, 24b, 24c of the Y-shape framework define an "optical bench" as they contain a network of optical delay paths for transferring the respective image data of the extended object scene that is collected by each of the subaperture telescopes 22 to a beam combiner contained with the bus 26. The collected image data from each multiple subaperture telescopes 22 is added together in coherent fashion by the beam combiner to form a single high resolution image at the focal plane of the beam combiner. The optical delay paths include active optics to correct for phase and line of sight errors.

The data image collection and transfer process is best understood with reference to FIG. 5 which shows, by way of example, the transfer of image data collected by one subaperture telescope 22 to the focal plane 60 of the beam combiner 54. Light energy 38 from an extended object scene is received by the primary mirror 32 of the subaperture telescope 22 where it is then reflected first to the secondary mirror 34 and then focused back to a hole 40 in the primary mirror 32. The hole 40 can be located slightly off-axis as shown or on-axis as preferred.

After passing through the hole 40, the focused beam is bounced off of a flat mirror 42 to a tertiary mirror 44.where the beam is then collimated. The collimated beam then travels to a fold mirror 46 and then directed to an active optical system which includes a fine movement mirror 48 and a pair of course movement mirrors 50. From the course movement mirrors 50 the beam is reflected off a beam injection mirror 50 to the primary mirror 56 of the beam combiner 54. The beam is then redirected to a secondary mirror 58 of the beam combiner and is brought to a focus to form an image at focal plane 60 of the beam combiner 54. The respective beams which originate from the other subaperture telescopes 22 are added coherently to one another by the beam combiner 54 to form a single image of the object scene.

PHASING OF THE SUBAPERTURE TELESCOPES

Phasing of the subaperture telescopes 22 is made possible by use of a phase diversity sensor placed at the focal plane 60 of the beam combiner 54. The phase diversity sensor compares the focused image of the object scene formed at the focal plane to a defocused image of the same object scene. The amount of defocus being known beforehand. From the comparison of the focused and defocus images, information about the wavefront errors in the optical system can be calculated using the concept of phase diversity.

Briefly, as applied to the present invention, the phase diversity technique involves determining the Fourier Transforms of the compared images, calculating scene independent metrics from the Fourier Transforms, and using a general regression neural network (GRNN) algorithm to calculate the phasing errors.

The information about the phasing errors is then used by the phase controller 62 to reposition the beam combining mirrors of the optical delay paths associated with each subaperture telescope in order to correct the phasing errors. In particular, the phase controller 62 sends tilt and piston adjustment signals to the fine movement and course movement mirrors 48 and 50, respectively, to ensure that the path lengths travelled by the respective beams originating from each subaperture telescope 22 to the beam combiner 54 are maintained equal.

For an in depth discussion of the underlying mathematics involved with the GRNN algorithm the reader is directed to the published technical paper entitled: "Phase-Diversity Wavefront Sensor For Imaging Systems", Applied Optics, Vol. 33, No. 27, published Sep. 20, 1994. Further, for an in depth discussion of the phase diversity concept, the reader is directed to a paper by Robert A. Gonsalves entitled "Phase retrieval and diversity in adaptive optics," Opt. Eng. 21 829–832 (1982). The two above noted publications are incorporated by reference to this application.

STEERABLE FIELD OF REGARD

An advantageous feature of the present invention is that each of the subaperture telescopes 22 is provided with steering means for steering the line of sight or the "instantaneous field of view" of each subaperture telescope 22 within the much broader field of regard of the multi-aperture optical imaging system 20. The field of regard of the system is also the full field of view of the individual subaperture telescopes 22. With reference to FIG. 5, the steering means is provided by moving the fold mirror 46. This, in turn changes the line of sight of the subaperture telescopes 22 within the field of regard of the system. The multi-aperture design of the present invention advantageously provides a large field of regard so that satellite slewing is avoided when changing the instantaneous field of view.

FIG. 6 illustrates the transfer of image data collected by two adjacently positioned subaperture telescopes 22 to the beam combiner 54. FIG. 6 also shows how the path length of light travelled between each subaperture telescope 22 and the beam combiner 54 is maintained equal by appropriate positioning of the respective fine movement mirrors 48 and course movement mirrors 50. FIG. 6 also illustrates the preferred spacing between adjacent subaperture telescopes 22 along their respective arm members 24a, 24b, 24c. The spacing is selected to provide a redundant array that ensures a uniform coverage of all spatial frequencies of the modulation transfer function (MTF). To put it another way, the redundant spacing as used in the present invention ensures that there are no zero values in the MTF. In order to ensure that there are no zero values in the MTF, the center-to-center spacing between two adjacent subaperture telescopes 22 should be within 2d, where d is the diameter of the subaperture telescopes.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A multiple aperture imaging system for continuous dwell imaging of complex extended scenes which are not required to contain localized point sources, said multi-aperture imaging system comprising:
   a) a plurality of subaperture telescopes, each subaperture telescope for collecting image data of an instantaneous field of view of an extended object scene within a field of regard of the imaging system;
   b) beam combiner means for adding together said image data collected by each of said subaperture telescopes in coherent fashion to form a single high resolution image of said object scene;
   c) phasing means for optically phasing said plurality of subaperture telescopes; and
   d) frame means for supporting said plurality of subaperture telescope in an array with redundant spacing sufficient to provide a desired uniform coverage of the spatial frequencies of a modulation transfer function (MTF) of the imaging system, said frame means comprises a collapsible support structure that is movable between a first stowed position in which said imaging system fits within a volume constrained launch canister, and a second deployed position.

2. The multiple aperture imaging system as in claim 1, wherein said phasing means includes:
   a) a network of optical delay paths for transferring at equal rates said image data collected by each of said subaperture telescope to said beam combiner means;
   b) a phase diversity sensor for detecting phasing errors contained in said single high resolution image; and
   b) adaptive optics responsive to said phase diversity sensor for controlling phase and line of sight errors in said network of optical delay paths.

3. The multiple aperture imaging system as in claim 1, wherein said collapsible support structure includes three elongated frame members disposed pivotally connected at equal intervals about a central hub.

4. The multiple aperture imaging system as in claim 3, wherein each of said subaperture telescopes is of equal diameter d, and wherein said redundant array spacing is ensured by locating respective centers of adjacent subaperture telescopes within a 2d distance.

5. The multiple aperture imaging system as in claim 1, wherein each of said subaperture telescopes includes:
   a) a primary mirror for receiving light energy from an extended object scene;
   b) a secondary mirror effective to focus light energy reflected from said primary mirror through a hole disposed in said primary mirror; and
   c) said secondary mirror being connected to said primary mirror by a collapsible support assembly, and wherein said collapsible support assembly is movable between a first folded position in which said secondary mirror lies substantially adjacent said primary mirror for compact stowage capability within said volume constrained launch canister, and a second deployed position in which said secondary mirror is located at a desired generally axially centered location in front of said primary mirror.

6. The multiple aperture imaging system as in claim 5, wherein each of said plurality of subaperture telescopes includes steering means for steering said instantaneous field of view within said field of regard.

7. The multiple aperture imaging system as in claim 6, wherein said steering means includes a movable fold mirror effective to change a line of site of a respective subaperture telescope.

8. The multiple aperture imaging system as in claim 1, wherein each of said plurality of subaperture telescopes includes steering means for steering said instantaneous field of view within said field of regard.

9. The multiple aperture imaging system as in claim 8, wherein said steering means includes a movable fold mirror effective to change a line of site of a respective subaperture telescope.

10. A multiple aperture imaging system for continuous dwell imaging of complex extended scenes which are not required to contain localized point sources, said multi-aperture imaging system comprising:
    a) a plurality of subaperture telescopes, each subaperture telescope for collecting image data of an instantaneous field of view of an extended object scene within a field of regard of the imaging system;
    b) a beam combiner having a focal plane, said beam combiner for receiving said image data collected by each of said subaperture telescopes and for adding the image data coherently to one another to form a single high resolution image of said object scene at said focal plane of said beam combiner;
    c) a phasing means for optically phasing said plurality of subaperture telescopes; and
    d) a frame assembly for supporting and spacing said plurality of subaperture telescope in a redundant array sufficient to provide a desired uniform coverage of the spatial frequencies of a modulation transfer function (MTF) of the imaging system, said frame assembly is collapsible being movable between a first stowed position in which said imaging system fits within a cargo space of a launch vehicle and a second deployed position.

11. The multiple aperture imaging system as in claim 10, wherein said phasing means includes:

a) a network of optical delay paths for transferring at equal rates said image data collected by each of said subaperture telescope to said beam combiner means;

b) a phase diversity sensor for detecting phasing errors contained in said single high resolution image; and b) an adaptive optics assembly responsive to said phase diversity sensor for controlling phase and line of sight errors in said network of optical delay paths.

12. The multiple aperture imaging system as in claim 10, wherein said frame assembly includes three elongated frame members disposed pivotally connected at equal intervals about a central hub.

13. The multiple aperture imaging system as in claim 12, wherein each of said subaperture telescopes is of equal diameter d, and wherein said redundant array spacing is ensured by locating respective centers of adjacent subaperture telescopes within a 2d distance.

14. The multiple aperture imaging system as in claim 10, wherein each of said subaperture telescopes includes:

a) a primary mirror for receiving light energy from an extended object scene;

b) a secondary mirror effective to focus light energy reflected from said primary mirror through a hole disposed in said primary mirror; and c) said secondary mirror being connected to said primary mirror by a collaspable support assembly, and wherein said collapsible support assembly is movable between a first folded position in which said secondary mirror lies substantially adjacent said primary mirror for compact stowage capability within said volume constrained launch canister, and a second deployed position in which said secondary mirror is located at a desired generally axially centered location in front of said primary mirror.

15. The multiple aperture imaging system as in claim 14, wherein each of said subaperture telescopes includes a movable fold mirror effective to change a line of site of a respective subaperture telescope for changing said instantaneous field of view within said field of regard.

16. The multiple aperture imaging system as in claim 10, wherein each of said subaperture telescopes includes:

a) a primary mirror for receiving light energy from an extended object scene;

b) a secondary mirror effective to focus light energy reflected from said primary mirror through a hole disposed in said primary mirror; and c) said secondary mirror being connected to said primary mirror by said collapsible support assembly such that said secondary mirror lies substantially adjacent said primary mirror for compact stowage capability within said volume constrained launch canister when said collapsible support assembly is moved to said first folded position, and said secondary mirror is located at a desired generally axially centered location in front of said primary mirror when said collapsible support assembly is moved to said second deployed position.

17. The multiple aperture imaging system as in claim 16, wherein each of said subaperture telescopes includes a movable fold mirror effective to change a line of site of a respective subaperture telescope for changing said instantaneous filed of view within said field of regard.

* * * * *